United States Patent
Belveze et al.

(10) Patent No.: US 9,300,516 B2
(45) Date of Patent: Mar. 29, 2016

(54) RECEIVER WITH CHANNEL ESTIMATION CIRCUITRY

(75) Inventors: Fabrice Belveze, Fontanil-Cornillon (FR); Olivier Isson, Voreppe (FR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 712 days.

(21) Appl. No.: 13/126,696

(22) PCT Filed: Oct. 29, 2009

(86) PCT No.: PCT/EP2009/064325
§ 371 (c)(1),
(2), (4) Date: Oct. 3, 2011

(87) PCT Pub. No.: WO2010/049508
PCT Pub. Date: May 6, 2010

(65) Prior Publication Data
US 2012/0020439 A1    Jan. 26, 2012

(30) Foreign Application Priority Data
Oct. 31, 2008   (FR) ...................................... 08 57422

(51) Int. Cl.
*H04L 1/02*            (2006.01)
*H04L 27/26*           (2006.01)
(Continued)

(52) U.S. Cl.
CPC .......... *H04L 27/2647* (2013.01); *H04L 25/022* (2013.01); *H04L 25/0232* (2013.01);
(Continued)

(58) Field of Classification Search
CPC ............ H04L 25/0232; H04L 25/0222; H04L 25/0202; H04L 25/0204; H04L 25/022; H04L 25/023; H04L 27/2647; H04L 5/0007; H04L 25/0216; H04L 25/0234
USPC .................... 375/267, 340, 342, 347; 455/303
See application file for complete search history.

(56) References Cited

U.S. PATENT DOCUMENTS 3,949,299 A * 4/1976 Song .............................. 375/250
4,990,925 A * 2/1991 Edelsohn ............. G01K 11/006
342/190
(Continued)

FOREIGN PATENT DOCUMENTS

JP        2002300132 A     10/2002
JP        2005151447 A      6/2005
(Continued)

OTHER PUBLICATIONS

Saeed V. Vaseghi "6 Wiener Filters", 2000, "Advanced Digital Signal Processing and Noise Reudction", second edition John Wiley and Sons, pp. 178-204.*
(Continued)

*Primary Examiner* — Sophia Vlahos
(74) *Attorney, Agent, or Firm* — Leffler Intellectual Property Law, PLLC

(57) ABSTRACT

The invention concerns receive circuitry for demodulating an input signal received from a transmission channel, the receive circuitry including a frequency interpolation filter arranged to provide channel estimations ($\hat{H}_n$) of the entire channel, the frequency interpolation filter having at least one filter receiving the pilot frequency channel estimations and performing filtering based on a plurality (Q) of the pilot channel estimations at a time; and a memory arranged to store the filter coefficients for the at least one filter, the coefficients being based on a frequency-domain autocorrelation of a model of the transmission channel, the model representing the time distribution of the channel power of the transmission channel determined independently of the pilot frequency channel estimations, wherein said model is based on a $\chi^2$ distribution.

13 Claims, 3 Drawing Sheets

(51) Int. Cl.
  *H04L 25/02* (2006.01)
  *H04L 5/00* (2006.01)
(52) U.S. Cl.
  CPC ........... *H04L25/0234* (2013.01); *H04L 5/0007* (2013.01); *H04L 5/0048* (2013.01); *H04L 25/0216* (2013.01)

(56) References Cited

U.S. PATENT DOCUMENTS

| | | | | |
|---|---|---|---|---|
| 5,127,051 | A | * | 6/1992 | Chan et al. .................... 375/348 |
| 6,064,703 | A | * | 5/2000 | Cusani et al. ................. 375/349 |
| 8,275,053 | B2 | * | 9/2012 | Bang et al. .................... 375/260 |
| 2005/0094738 | A1 | | 5/2005 | Park |
| 2005/0105647 | A1 | * | 5/2005 | Wilhelmsson ...... H04L 25/0234 375/316 |
| 2005/0174929 | A1 | * | 8/2005 | Hayashi et al. ............... 370/208 |
| 2007/0211827 | A1 | * | 9/2007 | Baggen ................. H04L 25/022 375/316 |
| 2007/0217327 | A1 | * | 9/2007 | Baggen et al. ................ 370/208 |
| 2009/0131123 | A1 | * | 5/2009 | Coersmeier .......... H04B 1/1036 455/574 |
| 2010/0002788 | A1 | * | 1/2010 | Wu et al. ...................... 375/260 |

FOREIGN PATENT DOCUMENTS

| | | |
|---|---|---|
| JP | 2006514499 A | 4/2006 |
| JP | 2007036403 A | 2/2007 |
| JP | 2007053733 A | 3/2007 |
| JP | 2007511942 A | 5/2007 |
| JP | 2009005103 A | 1/2009 |
| WO | 2005025161 A | 3/2005 |
| WO | 2005117377 A | 12/2005 |

OTHER PUBLICATIONS

Stefan Schiffermuller et al.; Practical Channel Interpolation for OFDMA; Global Telecommunications Conference, 2006; Nov. 1, 2006; 6 pages.

Jae-Kwon Lee et al.; Modified Dummy Sequence Insertion Method for PAPR Reduction of OFDM Signal; Vehicular Technology Conference, 2007; 4 pages.

Patent Cooperation Treaty International Search Report and Written Opinion for PCT/EP2009/064325; Jan. 27, 2010; 9 pages.

* cited by examiner

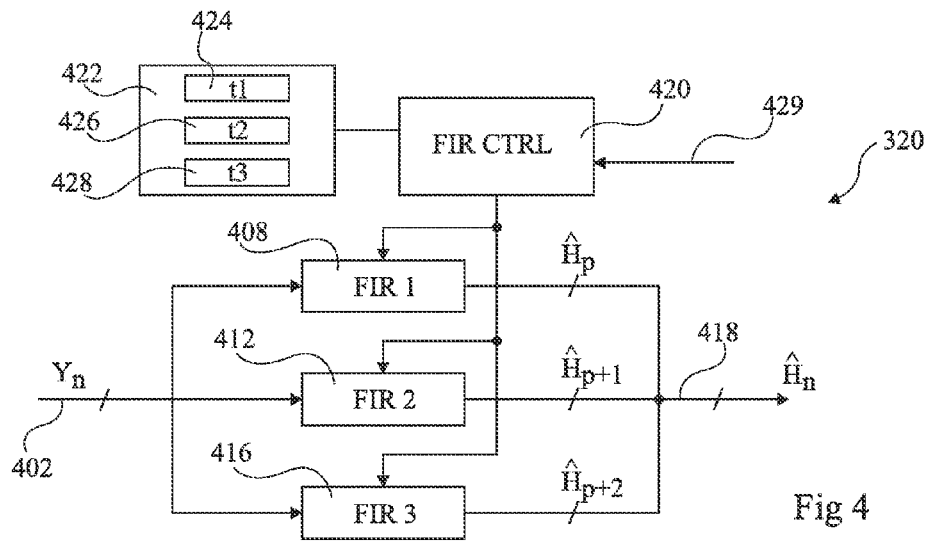
Fig 4
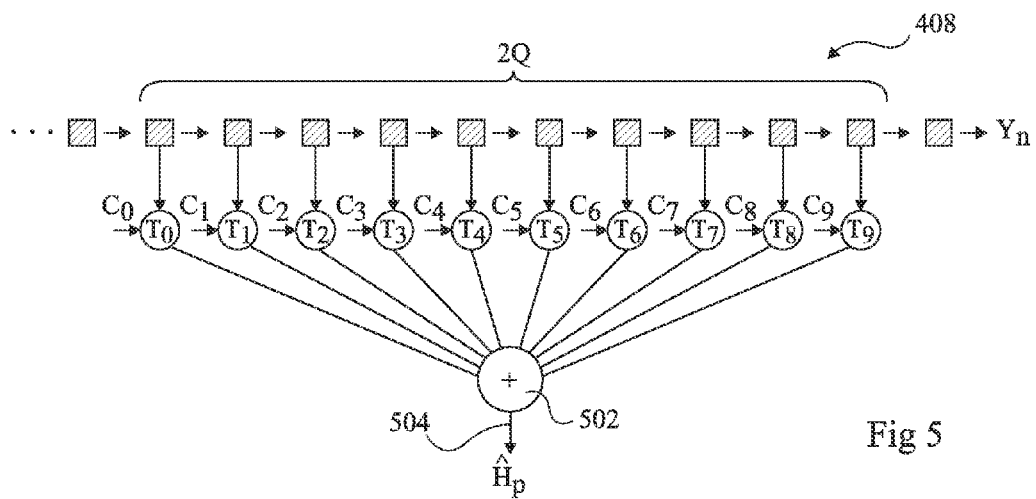
Fig 5
$$\begin{bmatrix} R_0+\beta^2 & R_3 & \dots R_{6Q-3} \\ R_{-3} & R_0+\beta^2 & \dots R_{6Q-6} \\ \dots & \dots & \dots \\ R_{-6Q+3} & R_{-6Q+6} & \dots R_0+\beta^2 \end{bmatrix}^{-1} \cdot \begin{bmatrix} R_{3Q-3} \\ R_{3Q-6} \\ \vdots \\ R_{-3Q} \end{bmatrix} \dots \cdot \begin{bmatrix} R_{3Q-2} \\ R_{3Q-5} \\ \vdots \\ R_{-3Q+1} \end{bmatrix} \dots \cdot \begin{bmatrix} R_{3Q-1} \\ R_{3Q-4} \\ \vdots \\ R_{-3Q+2} \end{bmatrix}$$
Fig 6

RECEIVER WITH CHANNEL ESTIMATION CIRCUITRY

CROSS-REFERENCE TO RELATED APPLICATIONS

This application is a U.S. National Phase application submitted under 35 U.S.C. §371 of Patent Cooperation Treaty application serial no. PCT/EP2009/064325, filed Oct. 29, 2009, and entitled RECEIVER WITH CHANNEL ESTIMATION CIRCUITRY, which application claims priority to French patent application serial no. FR0857422, filed Oct. 31, 2008, and entitled RECEPTEUR AVEN CIRCUIT D'ESTIMATION DE CANAL.

Patent Cooperation Treaty application serial no. PCT/EP2009/064325, published as WO2010049508, and French patent application serial no. FR0857422, are incorporated herein by reference.

TECHNICAL FIELD

The present invention relates to a receiver for receiving and demodulating a transmitted signal, and in particular to a receiver comprising channel estimation circuitry for estimating the channel

BACKGROUND

OFDM modulation is a frequency-division multiplexing scheme according to which packets of data are modulated on a large number of closely packed orthogonal sub-carriers. Each sub-carrier is modulated by a conventional modulation scheme, such as QAM (quadrature amplitude modulation) or PSK (phase shift keying). Data is divided into multiple parallel streams, one for each sub-carrier, and transmitted in symbols comprising all of the modulated sub-carriers.

Digital video broadcasting standards such as DVB-T (digital video broadcasting of terrestrial television) and DVB-H (digital video broadcasting to handheld devices) propose the use of OFDM modulation, and can be applied to wired or wireless signal transmission channels, and to various applications such as digital television and audio broadcasting, wireless networking and broadband internet. An advantage of OFDM modulation is its ability to cope with severe channel conditions, such as frequency selective fading.

Demodulating an OFDM signal generally involves performing analogue to digital conversion on the received signal, and then performing a fast Fourier transform (FFT) to convert the signal into the frequency domain. The resulting parallel streams are then processed to extract the data based on an estimation of the channel performed by channel estimation circuitry. However, a problem with existing channel estimation circuitry is that it tends to be inadequate, or complex and demanding on processing resources.

SUMMARY

Embodiments of the present invention aim to at least partially overcome one or more problems in the prior art.

According to one aspect of the present invention, there is provided receive circuitry for demodulating an input signal received from a transmission channel, the input signal comprising symbols having N sub-carriers comprising a plurality of data sub-carriers modulated by data signals and, in at least certain symbols, a plurality of pilot sub-carriers modulated by reference signals, the receive circuitry comprising: a Fourier transform block arranged to separate the received input signal into N frequency signals corresponding to the sub-carrier frequencies; a channel estimation block arranged to provide pilot frequency channel estimations based on frequency signals corresponding to frequencies on which pilot sub-carriers are present; a frequency interpolation filter arranged to provide channel estimations of the entire channel, said frequency interpolation filter comprising at least one filter receiving the pilot frequency channel estimations from the channel estimation block and performing filtering based on a plurality of said pilot channel estimations at a time; and a memory arranged to store the filter coefficients for the at least one filter, said coefficients being based on a frequency-domain autocorrelation of a model of the transmission channel, said model representing the time distribution of the channel power of the transmission channel determined independently of said pilot frequency channel estimations, wherein said model is based on a $\chi^2$ distribution.

According to one embodiment of the present invention, the frequency-domain autocorrelation is determined based on the discrete Fourier transform of samples of the model.

According to a further embodiment of the present invention, said model is based on the following equation: $\sigma^2(\tau) = A\tau e^{B\tau^2}$, where A and B are constants and $\tau$ is the time delay of each sample.

According to a further embodiment of the present invention, each of said samples ($\alpha j$) is determined as follows: $\alpha j = \sigma^2(j/Fs)$, where j is equal to 0, 1, ... (N−1), N being the number of sub-carrier frequencies, and Fs is the sampling frequency equal to N multiplied by the sub-carrier spacing.

The filter coefficients are for example obtained using the frequency-domain autocorrelation values and a received noise variance value.

According to a further embodiment of the present invention, the memory is arranged to store a plurality of sets of filter coefficients, each of said sets of filter coefficients being based on an autocorrelation of a different model of the time distribution of the channel power, each model being independent of said pilot frequency channel estimations, the receive circuitry further comprising circuitry for selecting one of said sets of filter coefficients.

According to a further embodiment of the present invention, each model has a different non-zero time duration, and wherein said circuitry selects one of said sets of coefficients based on an estimated non-zero time duration of the time distribution of the channel power in the transmission channel.

According to a further embodiment of the present invention, at least one filter is an FIR (finite impulse response) filter.

According to a further embodiment of the present invention, the at least one filter is arranged to perform a filtering function based on minimizing the mean square error.

According to a further embodiment of the present invention, the at least one filter is a Wiener filter.

According to a further embodiment of the present invention, the input signal is modulated based on OFDM (orthogonal frequency-division multiplexing) modulation.

According to a further embodiment of the present invention, each of the pilot sub-carriers comprises left and right neighbouring sub-carriers, and wherein the at least one filter comprises a first filter arranged to provide a channel estimation for the pilot sub-carriers, a second filter arranged to provide a channel estimation for the left neighbours of the pilot sub-carriers, and a third filter arranged to provide a channel estimation for the right neighbours of the pilot sub-carriers.

According to a further aspect of the present invention, there is provided an electronic device comprising an input for receiving the input signal, RF circuitry for digitalising the input signal, and the above receive circuitry.

According to a further aspect of the present invention, there is provided a mobile telephone comprising an input for receiving the input signal, RF circuitry for digitalising the input signal, and the above receive circuitry.

According to a further aspect of the present invention, there is provided a set-top-box comprising an input for receiving the input signal, RF circuitry for digitalising the input signal, and the above receive circuitry.

According to a further aspect of the present invention, there is provided a method of demodulating an input signal received from a transmission channel, the input signal comprising symbols having N sub-carriers comprising a plurality of data sub-carriers modulated by data signals and, in at least certain symbols, a plurality of pilot sub-carriers modulated by reference signals, the method comprising: separating the received input signal into N frequency signals corresponding to the sub-carrier frequencies; determining a pilot frequency channel estimation of the transmission channel based on the frequency signals corresponding to pilot sub-carriers; and filtering by at least one filter said pilot frequency channel estimations to determine an estimation of the entire channel, wherein filter coefficients for the at least one filter are based on an autocorrelation of a model of the time distribution of the channel power of the transmission channel, said model being independent of said pilot frequency channel estimation, wherein said model is based on a $\chi^2$ distribution.

According to a further embodiment of the present invention, the method further comprises selecting one of a plurality of sets of filter coefficients, each of said sets of filter coefficients being based on an autocorrelation of a different model of the time distribution of the channel power, each different model being independent of said pilot frequency channel estimation.

According to a further embodiment of the present invention, the method further comprises estimating a duration of the time distribution of the channel power, wherein each of said different models has a different non-zero duration, and said selection is based on said estimated duration of the time distribution.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which:

FIG. 4 illustrates a frequency interpolation filter according to embodiments of the present invention;

FIG. 5 illustrates a finite impulse response (FIR) filter of the frequency interpolation filter of FIG. 4 in more detail according to an embodiment of the present invention;

FIG. 6 illustrates matrices for determining filter coefficients according to an embodiment of the present invention;

DETAILED DESCRIPTION

Figure 1:
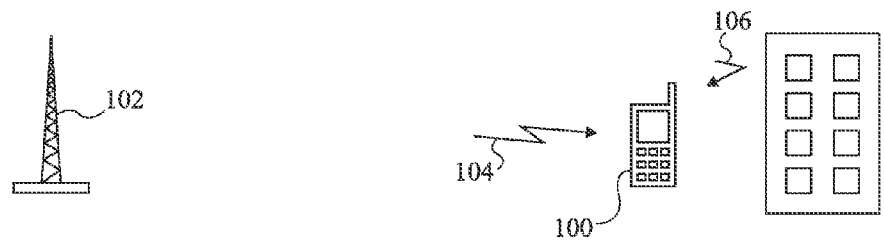
FIG. 1 illustrates a communications system comprising a mobile device.

FIG. 1 illustrates a mobile device 100, which receives from a mobile communication transmission mast 102 an OFDM modulated signal 104. The same signal is also received at the mobile device 100 in the form of an echo 106 from a building. The different path lengths of these signals leads to frequency selective fading, which disrupts reception of the data signal. The receiver in the mobile device 100 is adapted to cope with the frequency selective fading by estimating the transmission channel.

Figure 2:
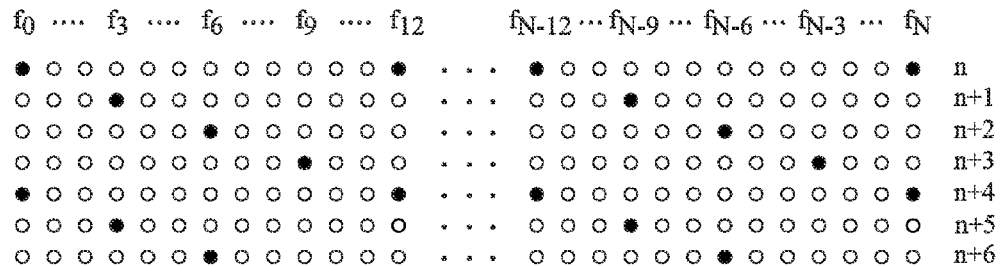
FIG. 2 illustrates sub-carriers of successive symbols including pilot sub-carriers according to embodiments of the present invention.

FIG. 2 illustrates an example of a series of 7 symbols n to n+6 transmitted according to OFDM modulation. Packets of data transmitted by each symbol are modulated on multiple sub-carrier frequencies $f_0$ to $f_N$, where N is for example in the range 2000 to 10000, for example approximately 8000. In systems conforming to the DVB-H standard, N is for example equal to 2048, of which 1705 are non-zero, 4096, of which 3409 are non-zero, or 8192, of which 6817 are non-zero. Modulation is for example performed according to a QAM (quadrature amplitude modulation) or PSK (phase shift keying) scheme, for example one of QPSK (quadrature PSK), 16QAM or 64QAM.

Hollow circles in FIG. 2 represent sub-carriers in each symbol that are modulated with data. Dispersed among the data sub-carriers of each symbol and shown by filled circles are a number of pilot sub-carrier signals that are modulated by a reference signal known to the receive circuitry. These pilot sub-carriers are used to make an estimation of the channel, which is used during demodulation of the data. In the example of FIG. 2, the pilot signals are provided every 12 sub-carrier frequencies in each symbol, and are offset by 3 sub-carrier frequencies from one symbol to the next. This means that for a series of four successive symbols, pilot sub-carrier signals will be present in one of the symbols at every third frequency. These frequencies, which contain both data signals and pilot signals, will be referred to herein as pilot sub-carrier frequencies. In the example of FIG. 2, the pilot sub-carrier frequencies are $f_0, f_3, f_6, \ldots, f_{N-3}$ and $f_N$.

The sub-carrier frequencies $f_0$ to $f_N$ are for example in the range of around 200 MHz to several GHz, for example between 470 MHz and 862 MHz, which is the range commonly used according to the DVB-H standard. The sub-carrier spacing $\Delta f$ is for example in the range of between 1 kHz and several tens of kHz depending on the bandwidth B, and the number of sub-carriers. The symbol length $T_U$ is for example in the range of between 50 μs and 1 ms, and the guard interval $T_G$ between symbols is for example in the range of $\frac{1}{32}$ to $\frac{1}{4}$ of the symbol length.

Figure 3:
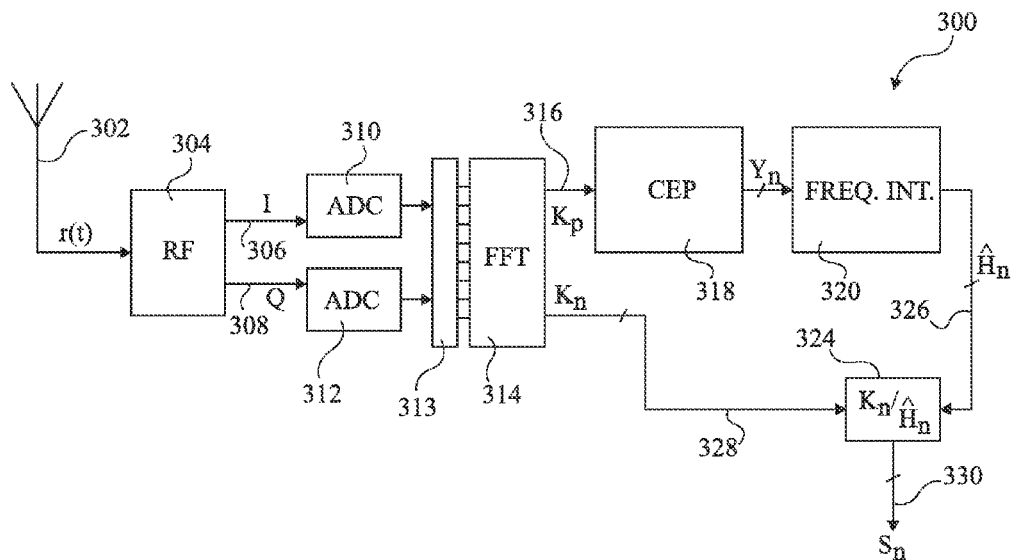
FIG. 3 illustrates receive circuitry according to an embodiment of the present invention.

FIG. 3 illustrates an embodiment of receiver circuitry 300 for receiving an OFDM modulated signal. Circuitry 300 is for example part of the mobile device 100 of FIG. 1. An antenna 302 receives the transmission as a signal r(t), which is processed by RF circuitry 304. RF circuitry 304 for example comprises mixers and/or filters, and outputs separate real and imaginary parts of the signal I and Q. The outputs I and Q are coupled by respective lines 306, 308 to analogue to digital converters 310 and 312 respectively. The outputs of converters 310 and 312 are coupled via a serial to parallel converter 313 to a fast Fourier transform (FFT) block 314, which converts the signal into the frequency domain. In particular, FFT 314 outputs N parallel signals $K_n$ for n=0 ... (N−1) corresponding to the N sub-carriers frequencies. A subset $K_P$ of these signals, corresponding to pilot sub-carrier frequencies in each symbol, is provided on lines 316 from the FFT 314 to a pilot sub-carrier channel estimation block CEP 318. CEP 318 provides estimations of the channel $Y_n$ based on the pilot sub-carrier frequencies. The channel estimations $Y_n$ are provided to a frequency interpolation filter 320.

Frequency interpolation filter 320 filters the signals $Y_n$ and outputs a channel estimation $\hat{H}_n$ for the entire channel on lines 326. Lines 326 are coupled to a divider 324, which also receives signals $K_n$ on line 328 from FFT 314, and performs a division $K_n/\hat{H}_n$ to generate an estimation of the originally transmitted data $S_n$ on output line 330.

FIG. 4 illustrates the frequency interpolation filter 320 of FIG. 3 in more detail. As illustrated, the channel estimations $Y_n$ are provided on input lines 402 to FIR (finite impulse response) filters 408, 412 and 416. $Y_n$ represents the noisy estimations, with n=3r and r=0, 1, 2, 3 ... etc. Thus the input to each filter receives the noisy estimates $Y_{n-3Q+3}$, $Y_{n-3Q+6}$, ..., $Y_{n-3}$, $Y_n$, ..., $Y_{n+3Q}$, where each filter has 2Q taps.

FIR filters 408, 412 and 416 are controlled by a control block FIR CTRL 420, which provides the filter coefficients to be used by each filter based on values from a memory 422. In this embodiment, memory 422 comprises three sets of filter coefficients 424, 426 and 428, each comprising coefficients for each of the filters. One of these sets is selected by the control block 420 based on an input received on an input line 429, as will be explained in more detail below. The selected set of coefficients is then provided to the FIR filters 408, 412 and 416. The selection is based on an estimation of the duration of the time distribution of the channel power determined by control block 420, as will be described in more detail below.

The FIR filters 408, 412 and 416 output channel estimations $\hat{H}_P$, $\hat{H}_{P+1}$ and $\hat{H}_{P+2}$ respectively, which together provide a channel estimation of the entire channel $\hat{H}_n$.

FIG. 5 illustrates FIR filter 408 in more detail according to one embodiment. Filters 412 and 416 are for example identical to filter 408.

Filter 408 receives the noisy estimations $Y_n$, which are applied to taps of the filter in groups of 10 successive values. In particular, in this example the filter operates on a sample 2Q values wide, where Q is equal to 5. The filter 408 comprises 10 taps $T_0$ to $T_9$, which multiply the 10 successive values of $Y_n$ by respective coefficients $C_0$ to $C_9$. The outputs from the taps $T_0$ to $T_9$ are summed by an adder 502 to provide a filtered output signal $\hat{H}_P$ on output line 504.

Determination of the filter coefficients $C_0$ to $C_9$ for the filter 408 and for the filters 412 and 416 of FIG. 4 will now be explained with reference to FIG. 6.

FIG. 6 shows matrices and vectors representing the contents of memory 422 of FIG. 4, which stores values related to calculation of the filter coefficients. The filters in this example are based on a filter that uses the autocorrelation of the channel. In particular, the filter is based on a Wiener filter, which is designed to minimize the mean square error.

As explained above, one in three of the sub-carrier frequencies contains pilot signals, which thus provide noisy estimates $Y_n$ of the channel, for n=3r, and r=0, 1, 2 ... etc. However, the filter should generate new estimates $\hat{H}_n$ of the channel for all n. With the filter being 2Q sub-carrier frequencies wide, to provide the estimation of $\hat{H}_n$ on all sub-carriers, Q noisy estimates on sub-carriers lower than n and Q noisy estimates on sub-carriers greater than or equal to n are used.

FIR filter 408 yields estimates on carriers where pilots, and thus noisy estimates, are present, while FIR 412 yields estimates on carriers whose left neighbour provides noisy estimates, and FIR 416 yielding estimates on carriers whose right neighbours provide noisy estimates.

The filter output $x_n$ can be defined as:

$$x_n = Y_n^t a$$

where $Y_n$ is the vector of noisy observations at the input of the filter, $Y_n^t$ is the transpose of vector $Y_n$, and "a" is the filter.

Applying the Wiener filter involves minimizing the mean square error, which can be defined as minimizing $E(|\epsilon|^2)$, where $\epsilon$ is the residual error defined as $X_n - x_n$, where $X_n$ is the desired filter output, in other words the correct estimation of the channel. The filter "a" can be determined as:

$$a = E(Y_n^* Y_n^t)^{-1} E(Y_n^* X_n)$$

where E( ) is the expected value and $Y_n^*$ is the complex conjugate of $Y_n$. The vector of noisy observations $Y_n$ is a combination of the original values and noise, and can thus be written as:

$$Y_n = X_n + \zeta_n$$

where $\zeta_n$ is the noise and is assumed to be white and Gaussian, with zero mean, variance $\beta^2$ and autocorrelation $\beta^2 \delta(n)$, where $\delta(n)$ is the delta (Dirac) function, where $\delta(n)=1$ for n=0, and $\delta(n)=0$ for n not equal to zero.

Calling $R_n$ the autocorrelation of $X_n$, defined as $E(X_k X_{k-n}^*)$, for k being any positive or negative integer, the Wiener filter coefficients can thus be represented as shown in FIG. 6 as the result of the inverse of a matrix 602 multiplied by a respective one of vectors 604, 606 and 608 for each of the filters 408, 412 and 416. Matrix 602 is a matrix of dimensions 2Q by 2Q, comprising, for each element along the diagonal, the autocorrelation $R_0$ added to the variance $\beta^2$ of the noise, and autocorrelation values $R_3$ to $R_{6Q-3}$ and $R_{-3}$ to $R_{-6Q+3}$ elsewhere. Vectors 604, 606 and 608 are each one value wide and 2Q values high. Vector 604 comprises autocorrelation values $R_{3Q-3}$ to $R_{-3Q}$, while vector 606 comprises autocorrelation values $R_{3Q-2}$ to $R_{-3Q+1}$, and vector 608 comprises autocorrelation values $R_{3Q-1}$ to $R_{-3Q+2}$.

Determining the autocorrelation values $R_j$ for pilot sub-carrier frequencies of the channel should be possible based on an estimation of the channel for these frequencies. However, for the other frequencies, there is no channel estimation, and interpolating the channel estimations for these frequencies in order to determine the autocorrelation for the whole channel would be complex to perform.

Given that the FIR filters 408, 412 and 416 perform filtering in the frequency domain, only frequency domain correlation is used, which can be defined as the Fourier transform of the time distribution of the channel power. In particular, assuming that all signals are second order stationary, that all echoes are statistically independent from each other, and that all components of the channel impulse response have the same spectrum, the autocorrelation of the channel can be expressed as:

$$R(\xi, \nu) = r(\xi) \int_0^T \sigma^2(\tau) e^{-2j\pi\nu\tau} d\tau = r(\xi) \times R(\nu)$$

where $r(\xi)$ is the time-domain normalized autocorrelation of the time varying impulse response of the channel $h(t,\tau)$, $\sigma^2(\tau)$ is the power attenuation at delay $\tau$, defined for example as $E(|h(t,\tau)^2|)$, and $R(\nu)$ is the frequency autocorrelation of the channel, in other words the Fourier transform of the power distribution for a delay τ, and equals:

$$R(v) = \int_0^T \sigma^2(\tau) e^{-2j\pi v\tau} d\tau$$

According to the embodiments described herein, the autocorrelations $R_j$ in the matrix 602 and in vectors 604, 606 and 608 are determined as follows:

$$R_j = DFT(\alpha_j)$$

where DFT is the discrete Fourier transform, and values $\alpha_j$ are samples of a model $\sigma^2$ of the time distribution of the channel power, wherein $j=0, 1, 2, \ldots, (N-1)$, N being the number of sub-carrier frequencies. In particular, $\alpha_j$ is equal to:

$$\alpha_j = \sigma^2(j/Fs)$$

where Fs is the sampling frequency equal to $N \times \Delta f$.

Thus, rather than being based on an estimation of the channel, the autocorrelation is based on the DFT of the time distribution of the channel power. This means that channel estimation over the entire channel is not performed, and instead a model for the channel power is assumed.

The matrix 602 also comprises the variance $\beta^2$ of the noise, which is for example assumed to be at a certain level based on an estimation of the transmission environment, and generally an assumed value of approximately 15 dB has been found to work well.

According to the embodiments described herein, the model of the channel power distribution is based on a chi-squared ($\chi^2$) distribution. For example, the model has the following form:

$$\sigma^2(\tau) = A\tau e^{-B\tau^2}$$

wherein A and B are constants and τ is the time. In one example, A and B are chosen such that the integral of the model matches the total received channel power, and/or such that the non-zero duration of the model is chosen to match the actual time distribution of the channel power. T.

The samples $\alpha_j$ are determined by evaluating $\alpha_j = \sigma^2(j/Fs)$, where Fs is the sampling frequency equal to N multiplied by the sub-carrier spacing.

Figure 7:
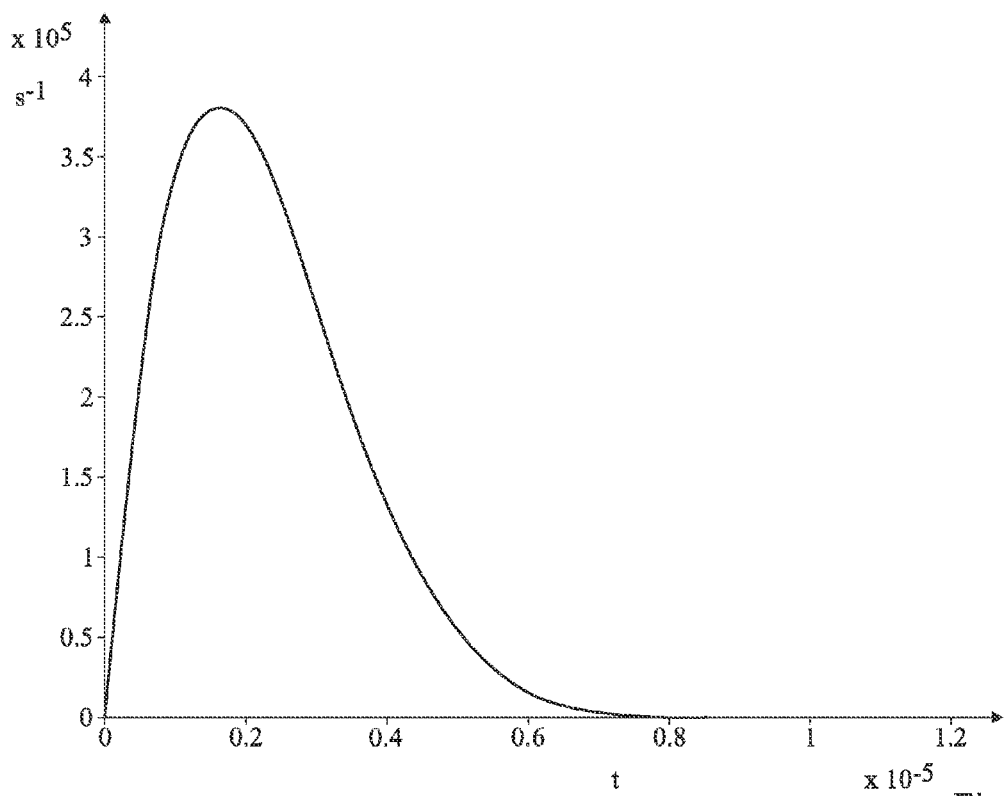
FIG. 7 illustrates a model of the time distribution of the channel power according to an embodiment of the present invention.

FIG. 7 illustrates one example of the model of the time distribution of the channel power according to a $\chi^2$ distribution, based on the following equation:

$$\sigma^2(\tau) = \frac{2\tau}{\Sigma^2} e^{-\frac{\tau^2}{\Sigma^2}}$$

where $\Sigma^2 = 5.10-12 s^2$ in this example.

Assuming $\Delta f = 2000$ Hz, and N=8192, the values of $\alpha_j$ can be determined by evaluating: $\alpha_0 = \sigma^2(0)$, $\alpha_1 = \sigma^2(6.10 \times 10^{-8})$, $\alpha_2 = \sigma^2(1.22 \times 10^{-7})$, ..., $\alpha_{8192} = \sigma^2(5 \times 10^{-4})$.

The present inventors have found that the use of the $\chi^2$ distribution provides very low error rates when compared to a perfectly matched Wiener filter, as will now be described with reference to the model of FIG. 7.

The mean square error (MSE) at the output of a Wiener filter, which can be interpreted as its output residual noise, is:

$$MSE = E(|X_n|^2) - E(X_n^* Y_n^t) a - a^H E(Y_n^* X_n) + a^H E(Y_n^* Y^t) a$$

where Xn is the desired filter output, Yn is the vector of noisy observations, a represents the filter coefficients, and aH represents the conjugate transposed vector a.

When the filter a is optimised, in other words the MSE defined above is minimized, the MSE simplifies to:

$$MSE = E(|X_n|^2) - E(X_n^* Y_n^t) E(Y_n^* Y_n^t)^{-1} E(Y_n^* X_n)$$

In the example of a so-called TU-6 channel, the propagation channel has 6 taps according to the following profile:

| Delay  | Power   |
|--------|---------|
| 0 s    | −3 dB   |
| 02 μs  | 0 dB    |
| 0.5 μs | −2 dB   |
| 1.6 μs | −6 dB   |
| 2.3 μs | −8 dB   |
| 5 μs   | −10 dB  |

Based on this example, assuming that the observations have a noise 15 dB below the mean power of the received signal, and assuming one pilot frequency every third carrier, it can be shown that the optimum Wiener filter noise is 25.73 dB below the wanted mean power.

Now assuming a Wiener filter based on the model of FIG. 7 using the $\chi^2$ distribution. Using the above non-minimized formula for the mean square error, the output signal to noise ratio (SNR) can be shown to equal 25.6 dB. This value is thus very close to the optimum, leading to very good bit error rate performance. As a further alternative, the time distribution of the channel power could be assumed to be a model defined as the convolution of a first model based on the $\chi^2$ distribution, such as the one represented in FIG. 7, with a second model comprising a uniform distribution of a determined duration.

Figure 8:
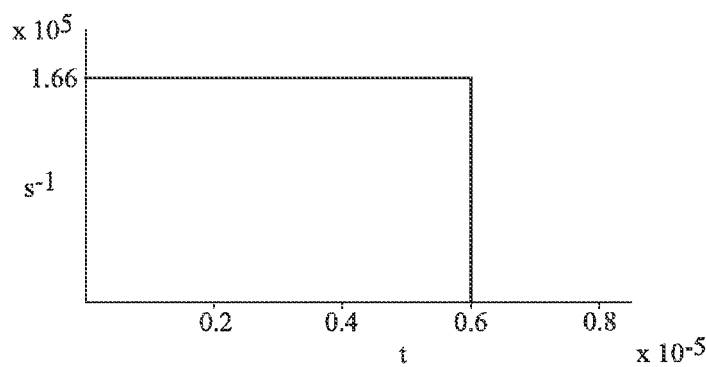
FIG. 8 illustrates an alternative model of the time distribution of the channel power according to an embodiment of the present invention.

FIG. 8 illustrates an example of such a uniform distribution, in this example having a duration of 6 μs. When convoluted with the first model, this results in a model having both a desired curve and a desired non-zero duration. A non-zero value is assumed to be a non-negligible value. For example, values of $\sigma^2(\tau)$ below 10 or 20 dB of the maximum value of $\sigma^2(\tau)$ can be considered to be negligible and thus zero.

As described above, according to some embodiments of the FIR filters, more than one set of coefficients is provided in the memory 424 of FIG. 4. Each set of coefficients is based on a different duration of the time distribution of the channel power, and for example the durations are in a range of 1 μs to 100 μs. For example, in the example of FIG. 7, the time distribution has a non-zero duration of approximately 8 μs, while the time distribution in the example of FIG. 8 has a non-zero duration of 6 μs. The duration of the time distribution is preferably chosen to correspond approximately to the true duration of the time distribution of power in the channel, which is for example determined by control block 420 of FIG. 4.

For example, the time duration can be measured based on the time domain impulse response of the channel h(τ), which is for example received by the FIR control block 420 in FIG. 4 on line 429. h(τ) can be computed by applying an inverse FFT to H(n). An instantaneous measurement of the time distribution of the power can be determined as $|h(\tau)|^2$. By accumulating such measurements over a number of OFDM symbols, or by low-pass filtering them, $\sigma^2(\tau)$ can be estimated as the expected value of $|h(\tau)|^2$. Alternatively, only one instantaneous measurement of $|h(\tau)|^2$ can be used as an approximation of $\sigma^2(\tau)$. In either case, the non-zero duration may be extracted from the approximation of $\sigma^2(\tau)$.

Filter coefficients based on a duration $t_1$, $t_2$ or $t_3$ of the time distribution of the channel power closest to the true value can then be selected by the control block 420.

Figure 9:
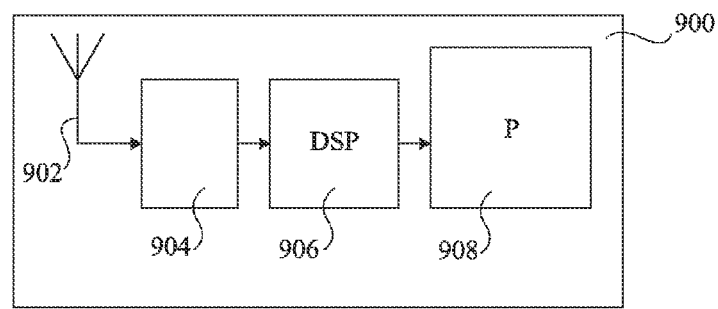
FIG. 9 illustrates an electronic device according to a further embodiment of the present invention.

FIG. 9 illustrates an electronic device 900 comprising an antenna 902, which receives an OFDM signal, and is coupled to receive circuitry 904, which for example comprises all or part of the circuitry described above in relation to FIG. 3. The output of the receive circuitry 904 is coupled to a digital signal processor (DSP) 906, which is further coupled to the main processor 908 of the device. DSP 906 may also be arranged to perform some operations of the receive circuitry, and for example in some embodiments the FIR filters of the interpolation filter 300 could be implemented by software executed by the DSP 906. Although not shown in FIG. 9, processor 908 is for example further coupled to one or more memory units, displays units, and/or other input and output units.

Device 900 is for example any electronic device that includes circuitry for demodulating an OFDM signal, such as mobile devices including telephones, laptop computers, PDAs (personal digital assistants), portable games consoles, etc. The electronic device could also be a device such as a PC or a set-top box. The communications channel over which the device 900 receives the input signal can be wireless, wired, or part wired and part wireless. Communications may be transmitted according to the DVB-H, DVB-T, WiMax or other communications standards. It should be noted that one or more of the names referred to in the present patent specification may be trademarks belonging to others.

An advantage of the receive circuitry described herein is that, by generating an estimation of the channel using an auto-correlation determined based on an assumed model of the time distribution of the channel power, the model being based on the $\chi^2$ distribution, very good performance can be achieved.

A further advantage of the receive circuitry described herein is that by providing more than one sets of alternative coefficients that may be applied by the filter, the estimation of the channel can be made more accurately. Each set of coefficients is based on a model of the assumed time distribution of channel power having a different non-zero duration, and one of these sets is advantageously selected based on an estimation of the actual duration of the time distribution of the channel power.

While a number of particular embodiments of the present invention have been described, it will be apparent to those skilled in the art that various modifications and alternatives may be applied.

For example, while some examples of particular modulation schemes have been provided, many variations may be applied. For instance, while in the embodiments described above the pilot sub-carrier frequencies occur every three frequencies, they could alternatively occur more or less often.

Furthermore, while in the embodiments described herein channel estimation is based on a Wiener filter applied by three FIR filters, it will be apparent to those skilled in the art that these filters could be combined into a single filter, or other types of filters based on an autocorrelation function can be used, and that a different number of filters could be used, depending on the distribution of pilot sub-carriers. Generally, there will be K filters if there is a pilot sub-carrier frequency every K-th sub-carrier.

Furthermore, memory 422 could comprise more or less than three sets of alternative filter coefficients for different time durations of the time distribution of the channel power, and the filter could comprise more or less than 10 taps. For instance, Q is for example in the range 1 to 200, leading to filters having between 2 and 400 taps. While two examples of models of the assumed time distribution of the channel power have been provided, other models could be used.

The invention claimed is:

1. Receive circuitry for demodulating an input signal received from a transmission channel, the input signal comprising symbols having a number of sub-carriers (N) comprising a plurality of data sub-carriers modulated by data signals and, in at least certain symbols, a plurality of pilot sub-carriers modulated by reference signals, the receive circuitry comprising:
   a Fourier transform block arranged to separate the received input signal into N frequency signals ($K_n$) corresponding to the sub-carrier frequencies;
   a channel estimation block arranged to provide pilot frequency channel estimations ($Y_n$) based on frequency signals ($K_P$) corresponding to frequencies on which pilot sub-carriers are present;
   a frequency interpolation filter arranged to provide channel estimations ($\hat{H}_n$) of the entire channel, said frequency interpolation filter comprising at least one filter receiving the pilot frequency channel estimations from the channel estimation block and performing filtering based on a plurality (Q) of said pilot channel estimations at a time; and
   a memory arranged to store filter coefficients for the at least one filter, said coefficients being based on time distribution of the channel power of the transmission channel determined independently of said pilot frequency channel estimations, wherein said model is based on a $\chi^2$ distribution,
   wherein said coefficients are determined based on the discrete Fourier transform of samples ($\alpha j$) of said model.

2. The receive circuitry of claim 1, wherein each of said samples ($\alpha j$) is determined as follows:

$$\alpha j = \sigma^2(j/Fs),$$

where j=0, 1, 2 . . . , (N−1) and N is the number of sub-carrier frequencies, and Fs is a sampling frequency equal to N multiplied by a sub-carrier spacing and $\sigma^2$ (j/Fs) is the power attenuation at delay time (j/Fs).

3. Receive circuitry for demodulating an input signal received from a transmission channel, the input signal comprising symbols having a number of sub-carriers (N) comprising a plurality of data sub-carriers modulated by data signals and, in at least certain symbols, a plurality of pilot sub-carriers modulated by reference signals, the receive circuitry comprising:
   a Fourier transform block arranged to separate the received input signal into N frequency signals ($K_n$) corresponding to the sub-carrier frequencies;
   a channel estimation block arranged to provide pilot frequency channel estimations ($Y_n$) based on frequency signals ($K_P$) corresponding to frequencies on which pilot sub-carriers are present;
   a frequency interpolation filter arranged to provide channel estimations ($\hat{H}_n$) of the entire channel, said frequency interpolation filter comprising at least one filter receiving the pilot frequency channel estimations from the channel estimation block and performing filtering based on a plurality (Q) of said pilot channel estimations at a time; and
   a memory arranged to store filter coefficients for the at least one filter, said coefficients being based on time distribution of the channel power of the transmission channel determined independently of said pilot frequency channel estimations, wherein said model is based on a $\chi^2$ distribution, wherein said memory is arranged to store a plurality of sets of filter coefficients, each of said sets of filter coefficients being based on a different model of the time distribution of the channel power, each model being independent of said pilot frequency channel estimations, the receive circuitry further comprising circuitry for selecting one of said sets of filter coefficients.

4. The receive circuitry of claim 3, wherein each model has a different non-zero time duration, and wherein said circuitry selects one of said sets of coefficients based on an estimated non-zero time duration of the time distribution of the channel power in the transmission channel.

5. The receive circuitry of claim 1, wherein said at least one filter is a finite impulse response (FIR) filter arranged to perform a filtering function based on minimizing a mean square error of the channel estimations ($\hat{H}_p$).

6. The receive circuitry of claim 1, wherein said at least one filter is a Wiener filter, and wherein said input signal is modulated based on orthogonal frequency-division multiplexing (OFDM).

7. An electronic device comprising an input for receiving the input signal, RF circuitry for digitalising the input signal, and the receive circuitry of claim 1.

8. A mobile telephone comprising an input for receiving the input signal, RF circuitry for digitalising the input signal, and the receive circuitry of claim 1.

9. A set-top-box comprising an input for receiving the input signal, RF circuitry for digitalising the input signal, and the receive circuitry of claim 1.

10. The receive circuitry of claim 1, wherein said model representing the time distribution of the channel power of the transmission channel is based on the following equation:

$$\sigma^2(\tau) = A\tau e^{-B\tau^2}$$

where A and B are constants, $\tau$ is the time delay of each one of samples ($\alpha j$) of the model and $\sigma^2(\alpha)$ is a power attenuation at delay $\tau$.

11. The receive circuitry of claim 1, wherein each of said pilot sub-carriers comprises at least one of a left and right neighbouring sub-carrier, and wherein said at least one filter comprises a first filter arranged to provide a channel estimation ($\hat{H}_p$) for the pilot sub-carriers, a second filter arranged to provide a channel estimation ($\hat{H}_p+1$) for the left neighbours of the pilot sub-carriers, and a third filter arranged to provide a channel estimation ($\hat{H}_p+2$) for the right neighbours of the pilot sub-carriers.

12. A method of demodulating an input signal received from a transmission channel, the input signal comprising symbols having N sub-carriers comprising a plurality of data sub-carriers modulated by data signals and, in at least certain symbols, a plurality of pilot sub-carriers modulated by reference signals, the method comprising:

separating the received input signal into N frequency signals ($K_n$) corresponding to the sub-carrier frequencies;

determining a pilot frequency channel estimation ($\hat{H}_p$) of the transmission channel based on the frequency signals corresponding to pilot sub-carriers;

filtering by at least one filter said pilot frequency channel estimations to determine an estimation ($\hat{H}_n$) of the entire channel, wherein filter coefficients for the at least one filter are based on a model of the time distribution of the channel power of the transmission channel, said model being independent of said pilot frequency channel estimation, wherein said model is based on a $\chi^2$ distribution; and selecting one of a plurality of sets of filter coefficients, each of said sets of filter coefficients being based on a different model of the time distribution of the channel power, each different model being independent of said pilot frequency channel estimation.

13. The method of claim 12, further comprising estimating a duration of the time distribution of the channel power, wherein each of said different models has a different non-zero duration, and said selection is based on said estimated duration of the time distribution.

\* \* \* \* \*